United States Patent [19]

Diamond et al.

[11] 4,207,305

[45] Jun. 10, 1980

[54] HEXACOORDINATED RUTHENIUM MODERATED PRODUCTION OF HYDROGEN PEROXIDE AND SULFUR FROM OXYGEN AND HYDROGEN SULFIDE

[75] Inventors: Steven E. Diamond, Randolph; Frank Mares, Whippany; Benjamin S. Tovrog, Parsippany, all of N.J.

[73] Assignee: Allied Chemical Corporation, Morris Township, Morris County, N.J.

[21] Appl. No.: 33,766

[22] Filed: Apr. 27, 1979

[51] Int. Cl.$^2$ .................... C01B 15/022; C01B 17/04
[52] U.S. Cl. .................. 423/573 R; 423/226; 423/571; 423/584
[58] Field of Search .............. 423/226, 571, 573, 584, 423/587; 252/431 N, 431 P

[56] References Cited

U.S. PATENT DOCUMENTS

| | | | |
|---|---|---|---|
| 3,923,966 | 12/1975 | Vaughan | 423/573 |
| 3,978,137 | 8/1976 | Frame | 423/573 X |
| 4,007,256 | 2/1977 | Kim | 423/584 |

FOREIGN PATENT DOCUMENTS 1490925  11/1977  United Kingdom.
1516418  7/1978  United Kingdom.

OTHER PUBLICATIONS

Pladziewicz et al., "Inorg. Chem.," vol. 12, No. 3, 1973, pp. 639–643.
Matsubara et al., "Inorg. Chem.," vol. 15, No. 5, 1976, p. 1107–1110.
Brulet et al., "J.A.C.S.," vol. 95, 1973, p. 4758–4759.
Lim, H. S. et al., "Inorg. Chem.," vol. 11, No. 7, 1973, pp. 1397–1403.

*Primary Examiner*—G. O. Peters
*Attorney, Agent, or Firm*—Alan M. Doernberg; Robert A. Harman

[57] ABSTRACT

A process of reacting in the liquid phase a hexacoordinated ruthenium(II) complex with oxygen in the presence of a source of hydrogen ions under conditions forming hydrogen peroxide and the corresponding hexacoordinated ruthenium(III) complex and reacting the hexacoordinated ruthenium(III) complex with hydrogen sulfide to form elemental sulfur and regenerate the hexacoordinated ruthenium(II) complex, the hexacoordinated ruthenium(III) complex having a reduction potential of not more than +0.68. Five or six of the ligands of the ruthenium complexes are non-labile in both valence states.

13 Claims, No Drawings

HEXACOORDINATED RUTHENIUM MODERATED PRODUCTION OF HYDROGEN PEROXIDE AND SULFUR FROM OXYGEN AND HYDROGEN SULFIDE

DESCRIPTION

BACKGROUND OF THE INVENTION

The production of hydrogen peroxide from oxygen and hydrogen in the liquid phase with complexed metals such as those of the platinum series (ruthenium, rhodium, palladium, iridium and platinum) has been proposed. In general, the metal in a low valence is oxidized by oxygen to a higher valence and reduced by hydrogen back to the low valence state. The net reaction is the formation of hydrogen peroxide from hydrogen and oxygen.

The reduction of oxygen to hydrogen peroxide by hexaamineruthenium(II) and by tris(ethylenediamine) ruthenium(II) has been reported by J. R. Pladziewicz et al in *Inorg. Chem*, vol. 12, pp. 639–43 (1973). In both cases, the hexacoordinated ruthenium(II) complex was produced by the reduction of the corresponding hexacoordinated ruthenium(III) complex with metals such as europium(II) or a zinc-mercury amalgam.

Hydrogen sulfide is a by-product of many industrial processes including petroleum cracking and purification and generally represents a disposal problem rather than a useful chemical feedstock. The use of hydrogen sulfide as a reducing agent, especially in catalytic systems, is sharply limited by the tendency of sulfur to participate in side reactions including the irreversible formation of metal sulfides with metal catalyst, thus poisoning the catalyst.

BRIEF DESCRIPTION OF THE INVENTION

The present invention includes the process of reacting in the liquid phase a hexacoordinated ruthenium (II) complex with oxygen in the presence of a source of hydrogen ions under conditions forming hydrogen peroxide and the corresponding hexacoordinated ruthenium(III) complex and reacting the hexacoordinated ruthenium(III) complex with hydrogen sulfide to form elemental sulfur and regenerate the hexacoordinate ruthenium(II) complex, said hexacoordinated ruthenium(III) complex having a reduction potential of not more than +0.68. The present invention also includes a process of generating a hexacoordinated ruthenium(II) complex by reacting the corresponding hexacoordinated ruthenium(III) complex with hydrogen sulfide in the liquid phase. Preferably the ruthenium complex is coordinatively saturated with non-labile ligands in both the divalent and trivalent state.

DETAILED DESCRIPTION OF THE INVENTION

The ruthenium complexes used in the processes of the present invention can be summarized by the formulae $L_6Ru^{++}$ and $L_6Ru^{+++}$. In the two cases, in order to achieve electronic neutrality, one or more anions with a total charge of $-2$ or $-3$ are also present. The present invention is not particularly limited with regard to the identity of the six ligands to which the ruthenium ion is coordinated, provided that the entire ruthenium complex retains an oxidation-reduction potential within the limitations described below. Representative ruthenium complexes are well known, being described for example in H. S. Lim et. al., *Inorg. Chem.*, vol. 11, pp. 1397–1403 (1972) and T. Matsubara et. al., *Inorg. Chem.*, vol 15, pp 1107–1110 (1976) wherein their reduction potentials are set forth. The six ligands may be represented by six separate monodentate species which may be the same or different or by three bidentate species, or by mixture thereof with a total of six coordination groups. Exemplary complexes are $(NH_3)_5Ru.py, (NH_3)_5RuN\equiv C\text{-}CH_3, (NH_3)_6Ru$, $(NH_2CH_2CH_2NH_2)_3Ru$, $(NH_3)_4Ru.bipy, (NH_3)_4Ru.py_2$, $(NH_2CH_2CH_2NH_2)_2Ru(NH_3)_2$, $(NH_2CH_2CH_2NH_2)Ru(NH_3)_4$, $(NH_2CH_2CH_2NH_2)_2Ru.py_2$, $[NH_2C(CH_3)_2C(CH_3)_2NH_2]_3Ru$, $[NH_2C(CH_3)_2C(CH_3)_2NH_2]_2Ru.bipy$, $(NH_3)_5Ru.OH_2$ and $(NH_3)_5Ru[C_6H_5\text{-}C(O)\text{-}CH_3]$ bearing at different times a plus two or plus three charge and wherein "py" represents pyridine and "bipy" represents bipyridine. Each such charged complex would normally be associated with an anion or group of anions of total negative charge sufficient to achieve neutrality. Suitable anions include halide, $PF_6^-$, $B(C_6H_5)_4^-$, $RCOO^-$, $ClO_4^-$, $S_2O_6^{-2}$, $BF_4^-$ and $C_6H_5SO_3^-$. Thus a representative neutral complex would be $[(NH_3)_6Ru]Cl_3$.

Preferably at least 5, and more preferably all 6 of the ligands have primary, secondary or tertiary amine nitrogens as the ligating atoms. Especially preferred is ammonia such that the complex includes pentaammineruthenium or hexaammineruthenium. Other highly preferred ligands which include nitrogen are pyridine, substituted pyridines, pyrazine, substituted pyrazines, ethylenediamine, substituted ethylenediamine, alkyl and aryl amines and nitriles.

Ligands having oxygen as the electron-donated species are somewhat less preferred since, in conjunction with ruthenium, they are somewhat more labile than nitrogen containing ligands. Nevertheless oxygen-containing ligands are suitable including augo, ethers, ketones, aldehydes, alcohols and carboxylates.

The first step of the present process involves the reduction of oxygen by the hexacoordinated ruthenium-(II) complex. The only requirements for this step are the presence of oxygen in a solvent, the presence of the ruthenium complex in or in contact with the solvent and a source of protons which may be the solvent itself. Although aqueous systems are preferred in which water is both the solvent and the source of protons, the present invention is not limited to aqueous systems but may also be practiced wherein the reduction of oxygen is conducted in organic solvents such as hydrocarbons, halogenated hydrocarbons, alcohols, ketones and ethers.

The reduction of oxygen to hydrogen peroxide involves a two electron transfer with a potential of +0.68 V (all voltages being NHE or having a normal hydrogen electrode as 0). Accordingly, in order for the reaction to proceed, the reduction potential of the ruthenium complex from the trivalent state to the divalent state must not exceed +0.68 V. As shown by the examples that follow, the apparent rate of oxygen reduction by the divalent ruthenium complex is directly related to this potential. Thus, while formation of hydrogen peroxide has been observed with ruthenium complexes having a reduction potential as high as +0.51 V, this reaction proceeds quickly only if the potential is at most about +0.2 V and proceeds almost instantaneously when this potential is at most about +0.1 V. Again the selection of ruthenium complexes having the desired reduction potential can be easily accomplished by consulting standard tables or by preparing an appropriate ruthenium complex and directly measuring its reduction potential in accordance with the procedures set forth in the above Lim et al. and Matsubara et al. references.

One unique feature of ruthenium complexes compared to other metal complexes proposed for the conversion of oxygen to hydrogen peroxide is that divalent ruthenium complexes cause the reduction of oxygen to hydrogen peroxide at a far greater rate than they cause the reduction of hydrogen peroxide to water. Accordingly, hydrogen peroxide can accumulate in substantial amounts rather than exist only as a transient species. This difference in rate is observed when at least 5 and preferably all 6 of the ligands are non-labile. By "non-labile" is meant a ligand which is not displaced to a greater extent than 50% by any of $OOH^-$, $SH^-$ or $S^{2-}$ on exposure for two minutes at standard conditions. It will be appreciated that the divalent state is generally more labile than the trivalent state such that the determination of lability can ordinarily be conducted on the divalent complex alone.

The present invention also includes the step of regenerating the divalent ruthenium complex from the trivalent ruthenium complex by reaction with hydrogen sulfide. It has been discovered that hydrogen sulfide is oxidized to elemental sulfur and thereby reduces ruthenium complex from the trivalent state to the divalent state in an extremely fast reaction. When at least 5 and preferably all 6 of the ligands of the ruthenium complex are non-labile as defined above, the reoxidation of the ruthenium complex back to the more stable trivalent state can be much faster, and therefore can compete successfully against, the irreversible formation from the divalent complex of ruthenium to sulfur bonds represented by the disulfur binuclear ruthenium ammines described in volume 95 of *The Journal of the American Chemical Society*, pages 4758–4759 (1973) by C. R. Brulet et al. In this regard the more preferred ruthenium complexes which are coordinately saturated with non-labile ligands can be used repeatedly for successive oxidations and reductions in the present process without a substantial loss to catalyst poisoning.

The following examples are intended to illustrate the present invention, without limitation, as set forth in the claims as follows.

Preparation of Complexes

Hexaammineruthenium(III) Chloride $[NH_3)_6Ru]Cl_3$.
Hexaamineruthenium(III) chloride containing 33% ruthenium was purchased from Matthey Bishop Inc. For synthetic purposes it was used without further purification. For other uses it was purified by repeated recrystallization to give a yellow crystalline solid.

When the hexaammineruthenium(III) chloride could not be purchased directly, it was prepared from ruthenium trichloride hydrate ($RuCl_3.H_2O$) containing 38.95% ruthenium supplied by Engelhard Industries. The method is given in J. E. Fergusson et. al. *Inorganic Syntheses*, Vol. 13, p. 208 (1971).

Chloropentaammineruthenium(III) Chloride[$(NH_3)_5RuCl]Cl_2$.

This complex was prepared according to the method of Vogt et. al., *Inorg. Chem.*, Vol. 4, p. 1157 (1965). Hexaamineruthenium(III) chloride (7 g) was dissolved in 150 mL of hydrochloric acid (75 mL of concentrated hydrochloric acid in 75 mL of water). The suspension was refluxed for 4 h with stirring at which time the yellow solid was filtered and washed with 1:1 hydrochloric acid, methanol, and finally acetone. This solid was recrystallized before use by dissolving 7 g of the complex in 1 L of 0.1 molar hydrochloric acid and heating at approximately 40° C. The resulting solution was filtered and allowed to cool slowly. The large orange crystals were filtered and washed with molar hydrochloric acid, methanol, and then acetone. The overall yield of $[(NH_3)_5RuCl]Cl_2$ was 83%.

cis-Dichlorotetraammineruthenium(III) Chloride cis-$[(NH_3)_4RuCl_2]Cl$

This complex was prepared by modification of the procedure of K. Glen et. al.; *Z. Anorg. Allg. Chem.*, Vol. 237, p. 355 (1938) and Vol. 268, p 202 (1952). A flask containing 215 ml of water was thoroughly degassed with argon (1 h). At this point approximately 4 g of recrystallized $[(NH_3)_5RuCl]Cl_2$ was added and argon bubbling was continued for an additional 30 min. To this degassed solution 25 mL of concentrated ammonium hydroxide was added and this mixture was stirred until all the solid dissolved (several hours at room temperature). A deaerated solution of 11 g of sodium dithionate ($Na_2S_2O_6.2H_2O$) in 50 mL of water was added and yellow-brown needles of $[(NH_3)_5RuOH]S_2O_6$ slowly formed. This hydroxo complex was washed with ether and used immediately for the next step.

This solid was dissolved in 150 mL of saturated oxalic acid and gently heated on a steam bath for approximately 15 min. After allowing the solution to cool a yellow crystalline solid was obtained and washed with ethanol and ether. This solid is the chelated oxalato complex $[(NH_3)_4Ru(C_2O_4)] (S_2O_6)_{\frac{1}{2}}$.

This complex was now added to 150 mL of 12 molar hydrochloric acid and the mixture was gently heated on a steam bath for 10 min. An equal volume of ethanol was added resulting in a flocculent yellow precipitate which was collected and washed with ethanol and ether.

It should be noted that all three of the previously mentioned complexes were dried in a vacuum desiccator after collection. They were stored in the air and were found to be stable indefinitely.

Using these modifications in the previously described method for the preparation of the hydroxo complex, yields of the final product, cis-$[NH_3)_4RuCL_2]Cl$ in excess of 70% were found as compared to 40% reported previously.

Aquopentaammineruthenium(III) Trifluoromethylsulfonate $[(NH_3)_5RuOH_2]$ $(TFMS)_3$. The hydroxo complex $[(NH_3)_5RuOH]S_2O_6$ was prepared as described in the previous section. At this point the complex was dissolved in a minimum amount of trifluoromethylsulfonic acid (distilled under reduced pressure and diluted to about 6 molar) by heating gently on a steam bath. Filtration was followed by slow cooling which result in an off-white solid which was filtered, washed with ether, and dried. Using this method the yield of $[(NH_3)_5RuOH_2] (TFMS)_3$ was greater than 90%.

cis-Diaquotetraammineruthenium(III) Trifluorosulsulfonate cis- $[NH_3)_4Ru(OH_2)_2] (TFMS)_3$ The oxalate complex was prepared as described in the previous section. This complex was dissolved in a minimum amount of 6 molar trifluoromethylsulfonic acid by gently heating on a steam bath. After filtering and cooling to room temperature, long, light orange needles of the desired complex were obtained. The yield of cis-[(NH$_3$)$_4$Ru(OH$_2$)$_2$] (TFMS)$_3$ was greater than 70%.

Pyridine and Bipyridine Ammine Complexes

The syntheses of [(NH$_3$)$_5$Rupy](PF$_6$)$_2$, [(NH$_3$)$_4$Rupy$_2$](PF$_6$)$_2$ and [(NH$_3$)$_4$Rubipy](PF$_6$)$_2$ were similar to that described in P. Ford et al., *J. Am. Chem. Soc.*, vol. 90, p. 1187 (1968); P. Ford et al., *Inorg. Chem.*, vol. 8, p. 1544 (1969). Chloropentammineruthenium(III) chloride (0.10 g, 0.35 mmol) was digested in 5 ml of silver trifluoroacetate solution (made by dissolving silver oxide (0.06 g, 0.26 mmol) in hot water by dropwise addition of aqueous trifluoroacetic acid). The resulting solution was filtered to remove silver chloride and purged with argon. Zinc amalgam was added to produce [(NH$_3$)$_5$RuOH$_2$]$^{2+}$. After 15 min a tenfold excess of the appropriate ligand was added and the solution was allowed to react for approximately 1 h. Approximately 1 g of ammonium hexafluorophosphate was added and the bubble flask was capped and stored in the refrigerator overnight. The resulting solid was filtered and washed with ethanol and ether. Recrystallization from water yielded the desired complex. An analogous procedure was followed for dichlorotetrammineruthenium(III) chloride. The corresponding ruthenium(III) complexes could conveniently be formed by silver oxidation of the ruthenium(II) complexes followed by addition of excess anion.

When it was desirable to eliminate chloride from the reacton mixture the aquo complexes discussed earlier were used, e.g., [NH$_3$)$_4$Ru(OH$_2$)$_2$](CF$_3$SO$_3$)$_3$ and [(NH$_3$)$_5$RuOH$_2$](CF$_3$SO$_3$)$_3$. In these cases direct reduction was possible without the necessity of solubilization. Bis(tetramethylethylenediamine)bipyridineruthenium(II) Hexafluorophosphate [(TMED)$_2$Rubipy](PF$_6$)$_2$. Tetramethylethylenediamine (TMED) was prepared by the method of R. Sayre, *J. Am. Chem. Soc.*, Vol. 96, p. 6689 (1955).

A solution of TMED.2HCl in water (7 mmol in 60 mL) was brought to approximately pH 9 with 10% NaOH. After deoxygenation with argon, [(NH$_3$)$_4$Rubipy](PF$_6$)$_2$ (7 mmol) was added (TMED/Ru ratio of 10/1). The resultant solution was placed in an oil bath at approximately 80° C. overnight. After cooling to room temperature, the volume of the solution was reduced under vacuum until a brown crystalline precipitation formed. This was filtered and dried. The solid was recrystallized from a water-acetone mixture and precipitated with excess ammonium hexafluorophosphate. Tris(tetramethylethylenediamine) ruthenium(II) Hexafluorophosphate [(TMED)$_3$Ru](PF$_6$)$_2$. This complex can be prepared in an analogous fashion to the bipyridine complex employing hexaammineruthenium(II) (prepared by reduction of the corresponding ruthenium(III) complex with zinc amalgam). Alternatively the method of F. M. Lever et. al, *Platinum Metals Rev.*, vol. 8, p. 106 (1964), for the preparation of tris(ethylenediamine) ruthenium(II) complexes can be employed.

Example 1—Reduction of (NH$_3$)$_5$Rupy$^{3+}$ 14.9 mg of [(NH$_3$)$_5$Rupy]$_2$(S$_2$O$_6$)$_3$ was dissolved in 10 mL of water (pH=4) which had been deaerated with argon gas. H$_2$S (atmospheric pressure) was bubbled in and within one minute the yellow color of (NH$_3$)$_5$Rupy$^{+2}$ was observed. After 30 minutes of treatment a visible spectrum was taken under an argon blanket on a Cary 14 spectrophotometer and showed about 100% conversion of (NH$_3$)$_5$Rupy$^{+3}$ to (NH$_3$)$_5$Rupy$^{+2}$.

Example 2—Reduction of (NH$_3$)$_4$Rupy$_2^{3+}$ 11.4 mg of (NH$_3$)$_4$Rupy$_2$(ClO$_4$)$_3$ was dissolved in 10 mL of water, and 5 mL of H$_2$S at atmospheric pressure was bubbled in. A change in color from pale yellow to deep yellow was observed immediately. After 10 seconds a visible spectrum was taken showing about 100% conversion of the complex to the divalent form.

Example 3—Reduction of (NH$_3$)$_4$Rubipy$^{+3}$

A small quantity of (NH$_3$)$_4$Rupy(PF$_6$)$_3$ was dissolved in water (giving a pink solution). Bubbling in H$_2$S caused an immediate deep red color indicating reduction of the complex to the divalent form.

Example 4—Reduction of (NH$_3$)$_5$RuOH$_2^{+3}$ 108 mg of [(NH$_3$)$_5$RuOH$_2$](TFMS)$_3$ and 254 mg of isonicotinamide (ISN) were dissolved in 10 mL of water degased with argon. Upon adding H$_2$S the solution turned orange within about one miniute indicating the formation of (NH$_3$)$_5$Ru ISN$^{+2}$. After degassing with argon, a visible spectrum of the liquid showed about 100% conversion to the divalent form trapped by ISN. This solution began to show elemental sulfur coagulating after about one hour. After one day the solution turned green due to the incorporation of sulfur into the coordination sphere of ruthenium.

When this experiment was repeated without ISN, this sulfur containing complex formed within two minutes from the divalent complex giving a green color. The color changed to brown and then to black over about 2 hours. The labile aquo is thus replaced by sulphide in a moderately fast reaction. It is believed that a rapid reoxidation to the trivalent complex could minimize this reaction where only one ligand is labile.

Example 5—Reduction of (NH$_3$)$_6$Ru$^{3+}$ 120.3 mg of (NH$_3$)$_6$RuCl$_3$ was dissolved in approximately 5 mL of 0.1 molar trifluoroacetic acid (pH 1). H$_2$S was bubbled through the solution for 10 minutes with no apparent change. A second sample of (NH$_3$)$_6$RuCL$_3$ (51.7 mg) was dissolved in 5 mL of 0.2 molar acetic acid and 5 mL of 1 molar sodium acetate (pH 6). H$_2$S was bubbled through the solution and after approximately 30 seconds the solution became cloudy with the formation of colloidal sulfur indicative that reduction of the ruthenium(III) to produce ruthenium (II) has taken place. The lower acidity favors a higher amount of HS$^-$ in the solution which is a stronger reductant than H$_2$S.

Example 6—Reduction of (NH$_2$C(CH$_3$)$_2$C(CH$_3$)$_2$NH$_2$)$_2$Rubipy$^{+3}$ 10.1 mg of (NH$_2$C(CH$_3$)$_2$C(CH$_3$)$_2$NH$_2$Ru.bipy (PF$_6$)$_3$ was dissolved in 10 mL of water and H$_2$S was added at atmospheric pressure. A visible spectrum after one hour showed detectable Ru$^{+2}$ representing about a 25% conversion. When the experiment was repeated for sixteen hours, the purple red color of the divalent complex was observed and a visible spectrum taken under argon showed about 100% reduction.

Example 7—Oxidation of (NH$_3$)$_5$Rupy$^{2+}$ 5.3 mg of [(NH$_3$)$_5$Rupy](PH$_6$)$_2$ (reprecipitated from water to remove impurities) was dissolved in 7.5 mL of water and 1 mL of 1 molar HCl to achieve a pH of about 1. Oxygen was bubbled through the solution and after 45 minutes the color changed from yellow to colorless. 2 mL of $10^{-2}$ molar ferrous solution was added. 1 mL of this solution was added to 8 mL of a sodium acetate (1 molar)—acetic acid (0.2 molar) buffer (1:1 by volume). The ferrous solution remaining after oxidation by $H_2O_2$ was determined by adding excess o-phenanthroline and monitoring the absorption at 508 nm characteristic of the tris(o-phenanthroline)ferrous complex. The yield of $H_2O_2$ was found to be 65% of theoretical.

Example 8—Oxidation of $(NH_3)_6Ru^{+2}$

When Example 7 was repeated with $[(NH_3)_6Ru](PF_6)_2$, as in *Pladziewicz et al.*, reaction took place at pH 4 with about 90% yield by hydrogen peroxide in seconds.

Example 9—Oxidation of $(NH_3)_4Rubipy^{+2}$

When Example 7 was repeated with $(NH_3)_4Rubipy(PF_6)_2$ at pH 1, the oxidation to Ru(III) was only 20% complete after several hours and the yield of hydrogen peroxide was about 40% of theoretical based on complex oxidized.

Example 10—Reduction of $(NH_3)_5Rupy^{3+}$ by $H_2S$ Followed by Oxidation to Product $H_2O_2$ 7.5 mg of $[(NH_3)_5Rupy](PF_6)_2$ (which had been previously prepared by the reduction of the corresponding ruthenium(III) complex with $H_2S$) was dissolved in 7 mL of water with 1 mL of 1 molar HCl. Oxygen was bubbled through the solution for 30 minutes during which time the solution changed from yellow to colorless. 2 mL of $10^{-2}$ molar ferrous solution was added. Following the procedure of Example 7, the hydrogen peroxide level was determined and was calculated to represent a 53% yield.

We claim:

1. A process for the production of hydrogen peroxide and elemental sulfur from oxygen and hydrogen sulfide which comprises reacting in the liquid phase a hexacoordinated ruthenium(II) complex with oxygen in the presence of a hydrogen ion donating species under conditions forming hydrogen peroxide and the corresponding hexacoordinated ruthenium(III) complex and reacting the hexacoordinate ruthenium(III) complex with hydrogen sulfide to form elemental sulfur and hydrogen ions and to regenerate the hexacoordinated ruthenium(II) complex, said hexacoordinated ruthenium(III) complex having a reduction potential to ruthenium(II) of no more than +0.68 volts and at least 5 of the 6 ligands being non-labile for both the hexacoordinated ruthenium(II) complex and the hexacoordinated ruthenium (III) complex.

2. The process of claim 1 wherein all 6 of the ligands are non-labile in the hexacoordinated ruthenium(II) complex and the hexacoordinated ruthenium(III) complex.

3. The process of claim 1 wherein at least 5 of the ligands of the hexacoordinated ruthenium complexes have nitrogen as the ligating atom.

4. The process of claim 1 wherein all 6 of the ligands of the hexacoordinated ruthenium complexes have nitrogen as the ligating atom.

5. The process of claim 1 wherein the reduction potential of said hexacoordinated ruthenium(III) complex to said hexacoordinated ruthenium(II) complex is not greater than about +0.2 volts.

6. The process of claim 1 wherein the reduction potential of said hexacoordinated ruthenium(III) complex to said hexacoordinated ruthenium(II) complex is not greater than about +0.1 volts.

7. The process of claim 1 wherein the reduction of oxygen is conducted in an aqueous phase.

8. The process of claim 1 wherein the oxidation of hydrogen sulfide is conducted in an aqueous phase.

9. A process of forming a hexacoordinated ruthenium (II) complex which comprises reacting a hexacoordinated ruthenium(III) complex with hydrogen sulfide in a liquid phase to produce the corresponding hexacoordinated ruthenium (II) complex, hydrogen ions and elemental sulfur, with at least five of the six ligands being non-labile for both the hexacoordinated ruthenium(II) complex and the hexacoordinated ruthenium(III) complex.

10. The process of claim 9 wherein all 6 of the ligands of said hexacoordinated ruthenium(III) complex are non-labile.

11. The process of claim 9 wherein all 6 of said ligands have nitrogen as the ligating atom.

12. The process of claim 9 wherein said reduction potential is not greater than about +0.2.

13. The process of claim 9 wherein said hexacoordinated ruthenium(III) complex has a reduction potential to ruthenium(II) not greater than +0.68.

* * * * *